United States Patent [19]

Ishikawa

[11] Patent Number: 5,723,957
[45] Date of Patent: Mar. 3, 1998

[54] METHOD AND APPARATUS FOR CONTROLLING SPINDLE MOTOR

[75] Inventor: Tetsuro Ishikawa, Kawasaki, Japan

[73] Assignee: Fujitsu Limited, Japan

[21] Appl. No.: 336,536

[22] Filed: Nov. 9, 1994

[30] Foreign Application Priority Data

Mar. 11, 1994 [JP] Japan .................................. 6-040697

[51] Int. Cl.⁶ .................................................. H02K 23/00
[52] U.S. Cl. ........................... 318/254; 318/439; 388/815
[58] Field of Search ................................. 318/254, 138, 318/439; 388/809–815

[56] References Cited

U.S. PATENT DOCUMENTS 5,079,487  1/1992  Malang ........................................ 318/254
5,220,257  6/1993  Yoshino et al. ............................. 318/254
5,378,976  1/1995  Inaji et al. ................................ 318/254 X

*Primary Examiner*—David S. Martin
*Attorney, Agent, or Firm*—Greer, Burns & Crain, Ltd.

[57] ABSTRACT

A brushless DC motor in which rotor magnetic poles were sine wave polarized is used. A rotational speed of the motor is detected by using one of Hall elements built in the DC motor. A control gain (A) to maintain the motor at a specified rotational speed is detected. Drive signals of three phases which were sine wave amplitude modulated on the basis of the detected rotational speed and the detected gain are supplied to the DC motor. A pulse amplitude control circuit which is used to activate the motor is used as a gain sensor. A gain which is used for the sine wave amplitude modulation is detected from a pulse amplitude modulation signal.

22 Claims, 11 Drawing Sheets

F I G. 4
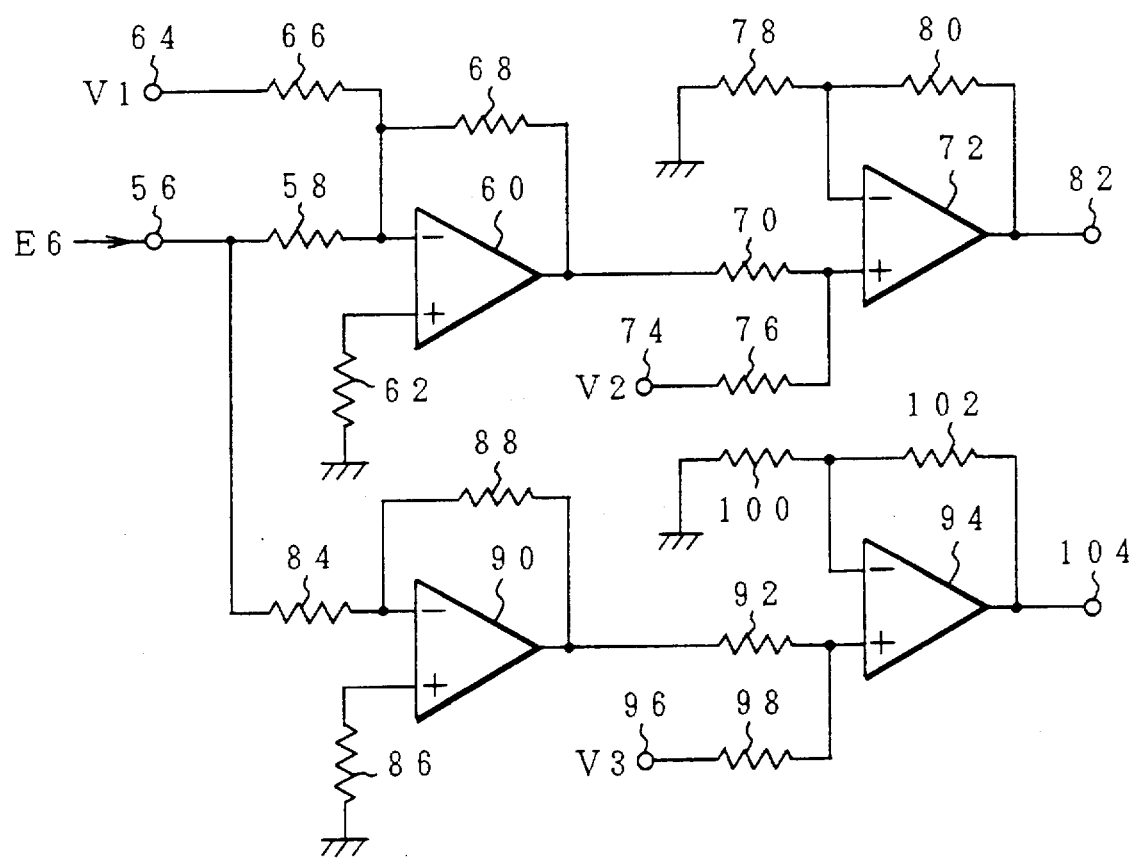

DAC 24-1 OUTPUT SIGNAL E6

SEPARATION OUTPUT SIGNAL E10

SEPARATION OUTPUT SIGNAL E11

METHOD AND APPARATUS FOR CONTROLLING SPINDLE MOTOR

BACKGROUND OF THE INVENTION

The present invention relates to apparatus and method for controlling a spindle motor which is used in a disk medium tester, a head testing apparatus, a servo track writing apparatus, or the like for a magnetic disk apparatus and, more particularly, to apparatus and method for controlling a spindle motor using a brushless DC motor.

In recent years, in apparatuses such as disk medium tester, a head testing apparatus, a servo track writing apparatus, and the like which are used in a production line of a magnetic disk unit, a control of a spindle motor of a low vibration and low noises is required in association with the realization of a high density of a magnetic disk unit which is produced. Simultaneously, it is also required to reduce the costs in association with a decrease in size of the disk medium to 3.5 or 2.5 inches.

Hitherto, a motor controller of such a spindle motor executes a PWM sine wave control such that a rotation of an AC servo motor is detected by an encoder, a pulse width of a sine wave which is supplied to the AC servo motor is controlled, thereby maintaining a specified speed. According to the motor controller which is constructed by combining the encoder to the AC servo motor, the costs are high and noises are generated by the switching for pulse driving. Therefore, it is unpreferable to use such a motor controller in an apparatus which is used in the production line of a unit like a magnetic disk unit which deals with a very weak signal.

In order to solve such problems of the AC servo motor, a motor controller is used to pulse width control a brushless DC motor by using a square wave. In this case, since the motor rotation is detected by a Hall element built in the motor, an encoder is unnecessary and the costs can be reduced. There are problems, however, such that noises occur by the pulse driving due to the switching and the S/N ratio of the signal which is dealt in the disk medium tester, head testing apparatus, servo track writing apparatus, and the like which are used in the production line of the magnetic disk unit is deteriorated.

A general brushless DC motor of the full polarization (whole surface polarization) type in which the polarization of a field magnet is uniform. When a coil phase is switched by the switching operation of a drive circuit, however, generation torques are not constant at the coil phases and a torque ripple according to an alternating magnetic pole of the field magnet occurs. Such a torque ripple causes a motor vibration causing the accuracies of the disk medium tester, head testing apparatus, servo track writing apparatus, and the like deteriorate.

SUMMARY OF THE INVENTION

According to the invention, there are provided a motor controller and a control method which can reduce the costs and can also decrease a vibration and noises by using a brushless DC motor for a spindle motor.

A motor controller of the invention controls a brushless DC motor of (m) phases and (n) poles. The rotation of the DC motor is detected by a rotation detecting section and a control gain A to maintain the DC motor to a specified rotational speed is detected by a gain detecting section. A sine wave amplitude modulating section outputs sine wave amplitude modulation signals (SAM) which were amplitude modulated and of the number corresponding to (m)-phase stator coils to the DC motor on the basis of the detected rotational speed and gain of the DC motor, thereby controlling the DC motor to the specified speed. A DC motor in which a rotor having (n) magnetic poles polarized with a sine wave distribution is used as such a DC motor. For example, a DC motor of three phases and four poles or three phases and eight poles is used. Although, the DC motor has (m) Hall elements in correspondence to the stator coils of (m) phases, one of the (m) Hall elements is used to detect the rotational speed. The gain is detected by using a pulse amplitude modulation signal (PAM) to drive the DC motor.

In the invention, a pulse amplitude modulating circuit is used as an activating circuit. Therefore, only the pulse amplitude modulation signal is used at the time of the activation of the DC motor. After the rotational speed reached the specified speed by the activation control by the pulse amplitude modulation signal, the pulse amplitude modulating circuit functions as a mere gain detecting section. That is, the pulse amplitude modulation signal is selected by the switching circuit at the time of the motor activation, thereby activating and controlling the DC motor. When the rotational speed reaches the specified speed, the sine wave amplitude modulation signal is selected by the switching circuit, thereby controlling the DC motor.

The pulse amplitude modulating circuit obtains the control gain A to maintain the specified speed on the basis of rotation detection signals from the (m) Hall elements provided in correspondence to the stator coils of (m) phases of the DC motor. The amplitudes of the pulse amplitude modulation signals of the number corresponding to the (m) phases which are supplied to the DC motor are controlled according to the control gain A. When the pulse amplitude modulating circuit is used as a gain detecting section, the control gain is detected from one amplitude (voltage) in the pulse amplitude modulation signals of the number corresponding to the (m) phases which are outputted from the pulse amplitude modulating circuit.

The sine wave amplitude modulating circuit comprises a rotational period arithmetic operating section, a divisional period arithmetic operating section, a sine data storing section, a sine wave amplitude arithmetic operating section, a D/A converting section, a separating section, and a driving section. The rotational period arithmetic operating section calculates a rotational period (T) of the DC motor on the basis of the rotation detection signal. The detection period (T) is divided into a predetermined number (N) of periods by the divisional period arithmetic operating section, thereby obtaining a divisional period ΔT. Sine data sinθ, sin2θ, sin3θ, . . . , and sinN.θ of every rotational angle θ which is obtained by dividing the angle of one rotation by the predetermined number (N) have preliminarily been stored in the sine data storing section. The sine wave amplitude arithmetic operating section sequentially reads out the sine data sinθ to sinN.θ from the sine data storing section every time the divisional period ΔT elapses and multiplies with the detection gain (A) of the gain detecting section, thereby obtaining sine wave amplitude values A.sinθ to A.sinN.θ as digital data. The sine wave amplitude data is outputted with a phase deviation of (π/m) to each stator coil. The D/A converting section converts each of the sine wave amplitude data into the analog signal. The separating section separates the sine wave amplitude modulation signal from the D/A converting section into two signals. Further, in the driving unit, a switching circuit is formed by serially connecting a pair of switching devices of different operation polarities, such switching circuits of the number as many as the number of stator coils of (m) phases are connected in parallel between power source lines. The driving unit drives the switching devices so that each stator coil produces a rotational magnetic field by a combination of two sine wave amplitude modulation signals from the separating section.

The rotational period arithmetic operating section has a rotation interruption generating section for detecting a signal change of everyone rotation by the rotation detecting section and for outputting an interruption signal and a counter section for continuously counting clocks. The counter value is latched every time the interruption signal is obtained and a rotational period is obtained as a difference between the counter value which was latched at the previous time and the counter value which is latched at this time. The divisional period arithmetic operating section counts the clocks by presetting the divisional period $\Delta T$ into a preset counter and instructs the sine wave amplitude arithmetic operating section to calculate the sine wave amplitude value every time the clock count value reaches the preset value.

The sine wave amplitude modulating circuit is provided for a motor control section. The motor control section can be constructed by a digital signal processor. The motor control section activates the DC motor by switching to the pulse amplitude modulation signal when a start command is received from the upper apparatus. When the arrival to the specified rotational speed is recognized after the activation, the motor control section switches to the sine wave amplitude modulation signal, thereby driving the DC motor. Further, when a stop command is received from the upper apparatus, the motor control section stops the DC motor.

Further, the invention provides a motor control method. The motor control method of the invention comprises the steps of:

detecting a rotational speed of a brushless DC motor of (m) phases and (n) poles; and detecting the control gain (A) to maintain the DC motor at the specified rotational speed, wherein the sine wave amplitude modulation signals of the number corresponding to (m) phases which were amplitude modulated on the basis of the motor detection rotational speed detected in the rotation detecting step and the detection gain (A) detected in the gain detecting step are outputted to the DC motor, thereby controlling the DC motor to the specified speed.

According to the invention, the brushless DC Hall motor polarized so as to obtain a sine wave distribution is driven by a sine wave signal and the sine wave signal is amplitude modulated so that the motor maintains the specified rotational speed, thereby realizing low costs, low vibration, and low noises. The brushless DC motor generally uses a square wave polarization (whole surface polarization) in which each field magnet of the rotor is uniformly polarized to form a magnetic pole. On the contrary, in the present invention, a sine wave polarization is used in order to prevent the generation of the torque ripple when the coil phase is switched by the square wave polarization. In order to also prevent noises which are generated by the switching by the pulse amplitude modulation signal, the sine wave amplitude modulation signal is used.

When the motor is activated, in order to rapidly start the rotation, enough activation torque is obtained by the driving by the pulse amplitude modulation signal. After the motor speed reaches the specified rotational speed by the activation by the pulse amplitude modulation signal, the driving mode is switched to the drive by the sine wave amplitude modulation signal, thereby providing a motor drive in which noise and torque ripple are suppressed. Further, in the detection of the motor rotation, only the detection signal of one of the Hall elements of the number corresponding to the number of coils built in the DC brushless motor is used. Thus, a construction of the rotation detecting section is extremely simplified. As for a gain detecting section which is used in the square wave amplitude modulation, the existing pulse amplitude modulating circuit which is provided as an LSI is used as a sensor. The existing pulse amplitude modulating circuit controls the sine wave amplitude modulation by detecting the control gain from one of the pulse amplitude modulation signals of the number as many as (m) phases to which the control gain to maintain the specified rotational speed is reflected. The gain sensor operates as an inherent pulse amplitude modulating circuit when the motor is activated and the gain detecting section and the pulse amplitude modulating circuit can be realized by the same circuit unit.

The above and other objects, features, and advantages of the present invention will become more apparent from the following detailed description with reference to the drawings.

BRIEF DESCRIPTION OF THE DRAWINGS

FIG. 4 is a circuit diagram of an embodiment of a separating circuit in FIG. 1;

DETAILED DESCRIPTION OF THE PREFERRED EMBODIMENT

Figure 1:
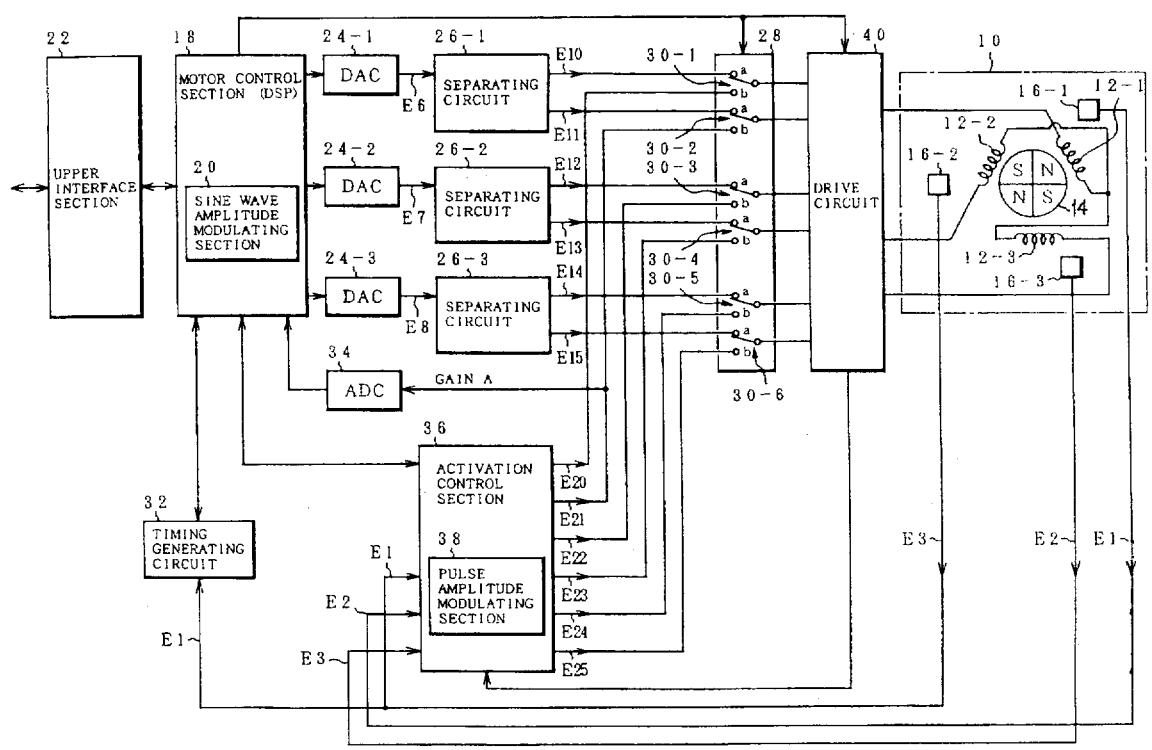
FIG. 1 is a block diagram of an embodiment of the invention.

In FIG. 1, a motor controller of the invention controls a brushless DC motor 10. In this embodiment, the brushless DC motor 10 of three phases and four poles is used. Namely, the DC motor 10 has stator coils 12-1, 12-2, and 12-3 which are delta connected and four magnetic poles are formed in a rotor 14. The magnetic poles of the rotor 14 are polarized on the basis of a sine wave distribution different from the polarization of a square wave distribution by an ordinary whole surface polarization. The brushless DC motor 10 has Hall elements 16-1, 16-2, and 16-3 therein in correspondence to the respective arrangement positions of the stator coils 12-1, 12-2, and 12-3. Hall signals E1, E2, and E3 which are inverted every rotation of 180° in correspondence to the passage of the magnetic poles of the rotor 14 are outputted from the Hall elements 16-1 to 16-3. There is a phase difference of 60° between each of the three Hall signals E1, E2, and E3. As a control section of the brushless DC motor 10, there is provided a motor control section 18 using a digital signal processor (DSP). The motor control section 18 functions as a main unit to control the brushless DC motor 10 and executes an interface control with an upper apparatus through an upper interface section 22, an activation control by a pulse amplitude modulation signal, which will be clearly described hereinlater, a switching of a stationary control by a sine wave amplitude modulation signal, and a generation of the sine wave amplitude modulation signal in the stationary control. A sine wave amplitude modulating section 20 drives the brushless DC motor 10 by the sine wave amplitude modulation signal in the stationary state after the activation is provided for the motor control section 18. The sine wave amplitude modulating section 20 generates the sine wave amplitude modulation signal to maintain the brushless DC motor 10 at a specified speed on the basis of, for example, a Hall signal E1 from the Hall element 16-1 among the Hall elements 16-1 to 16-3 provided for the brushless DC motor 10 in cooperation with a timing generating circuit 32 provided as an external circuit.

The sine wave amplitude modulating section 20 of the motor control section 18 outputs sine wave amplitude modulation data whose amplitude is controlled so as to maintain the motor at the specified rotational speed at a timing based on the rotation detection signal from the single Hall element 16-1 in a manner such that the data has a phase difference of 60°. The three sine wave amplitude modulation data are converted into the analog signals by D/A converters 24-1 to 24-3. In the embodiment, for example, 24 sine wave amplitude modulation data are supplied to the D/A converters 24-1 to 24-3 with the phase difference of 60° per one rotation of the brushless DC motor 10, thereby converting the data into the sine wave amplitude modulation signals. Separating circuits 26-1, 26-2, and 26-3 are provided subsequent to the D/A converters 24-1 to 24-3.

The separating circuits 26-1 to 26-3 separate each of sine wave amplitude modulation signals E6, E7, and E8 from the D/A converters 24-1 to 24-3 into signals to drive a pair of switching elements of different drive polarities provided in a drive circuit 40. For example, three serial circuits each comprising a P-channel FET and an N-channel FET are connected in parallel to the drive circuit 40 between power source lines in correspondence to the stator coils 12-1 to 12-3 of the brushless DC motor 10. Therefore, the separating circuits 26-1 to 26-3 separate the inputted sine wave amplitude modulation signals E6, E7, and E8 into sine wave amplitude modulation signals E10, E12, and E14 for the P channel and also separate the signals E6 to E8 into sine wave amplitude modulation signals E11, E13, and E15 for the N channel. The outputs of the separating circuits 26-1 to 26-3 are supplied to the drive circuit 40 through a switching circuit 28. The switching circuit 28 has six analog switches 30-1, 30-2, 30-3, 30-4, 30-5, and 30-6. Outputs of the separating circuits 26-1 to 26-3 are connected to switching terminals (a) of the analog switches 30-1 to 30-6. Outputs of an activation control section 36 are connected to switching terminals (b) of the analog switches 30-1 to 30-6. The analog switches 30-1 to 30-6 are switched to the (b) side by the motor control section 18 when the motor is activated, thereby supplying the pulse amplitude modulation signals from the activation control section 36 to the drive circuit 40. When a speed lock signal indicating that the activation control by the activation control section 36 has been completed and the rotational speed reached the specified speed is obtained from the activation control section 36, the motor control section 18 switches the switching circuit 28 to the (a) side, thereby supplying the sine wave amplitude modulation signals from the separating circuits 26-1 to 26-3 to the drive circuit 40.

A pulse amplitude modulating section 38 is provided for the activation control section 36. The pulse amplitude modulating section 38 controls the amplitudes of the pulse signals on the basis of the Hall signals E1 to E3 from the three Hall elements 16-1 to 16-3 provided for the brushless DC motor 10, thereby performing a pulse amplitude modulation to obtain the specified rotational speed. As an activation control section 36 having such a function of the pulse amplitude modulating section 38, for example, SSI32M593 "three-phase delta motor speed controller" manufactured by Silicon Systems Co., Ltd. can be used. The three-phase delta motor speed controller is an LSI of 20 pins and has a transfer function H(s) of the pulse amplitude modulation.

$$H(s)=Ki/s+Kp$$

The amplitude gains of the pulse signals are controlled so that the difference between the phase of the real rotation which is detected from the three Hall signals E1 to E3 and the phase of a reference rotation by a predetermined reference clock is set to zero.

Six pulse amplitude modulation signals E20 to E25 are outputted from the activation control section 36. The pulse amplitude modulation signals E20 and E21 control the outflow and inflow of a drive current to the stator coil 12-1. The pulse amplitude modulation signals E22 and E23 control the outflow and inflow of a drive current to the stator coil 12-2. Further, the pulse amplitude modulation signals E24 and E25 control the outflow and inflow of a drive current to the stator coil 12-3. Among the above amplitude modulation signals, the pulse amplitude modulation signals whose amplitude gains are controlled by the pulse amplitude modulating section 38 are the pulse amplitude modulation signals E21, E23, and E25 to outflow the drive currents. The pulse amplitude modulation signals E20, E22, and E24 on the outflow side are simple pulse signals whose amplitudes are constant. Therefore, by checking the amplitude voltages of the pulse amplitude modulation signals E21, E23, and E25 which were gain controlled by the pulse amplitude modulating section 38, the control gain can be known from the outside. The sine wave amplitude modulating section 20 of the motor control section 18 of the invention doesn't produce a control gain by itself. The pulse amplitude modulation signal E21 whose gain was controlled and which is outputted from the activation control section 36 is supplied to an A/D converter 34 and is regarded as a control gain of the brushless DC motor 10 by the sine wave amplitude modulating section 20, thereby deciding the sine wave amplitude data. Therefore, the sine wave amplitude modulating section 20 doesn't have a proportional integral system such as to decide the transfer function H(s) provided in the pulse amplitude modulating section 38 of the activation control section 36 but directly fetches the control gain from the outside and decides an amplitude of a sine wave to be outputted. As mentioned above, the sine wave amplitude modulating section 20 of the motor control section 18 doesn't need to internally produce a gain but only timings to generate the sine wave signals of three phases are needed.

The timings are decided in cooperation with the timing generating circuit 32 provided as an external circuit.

Figure 2:
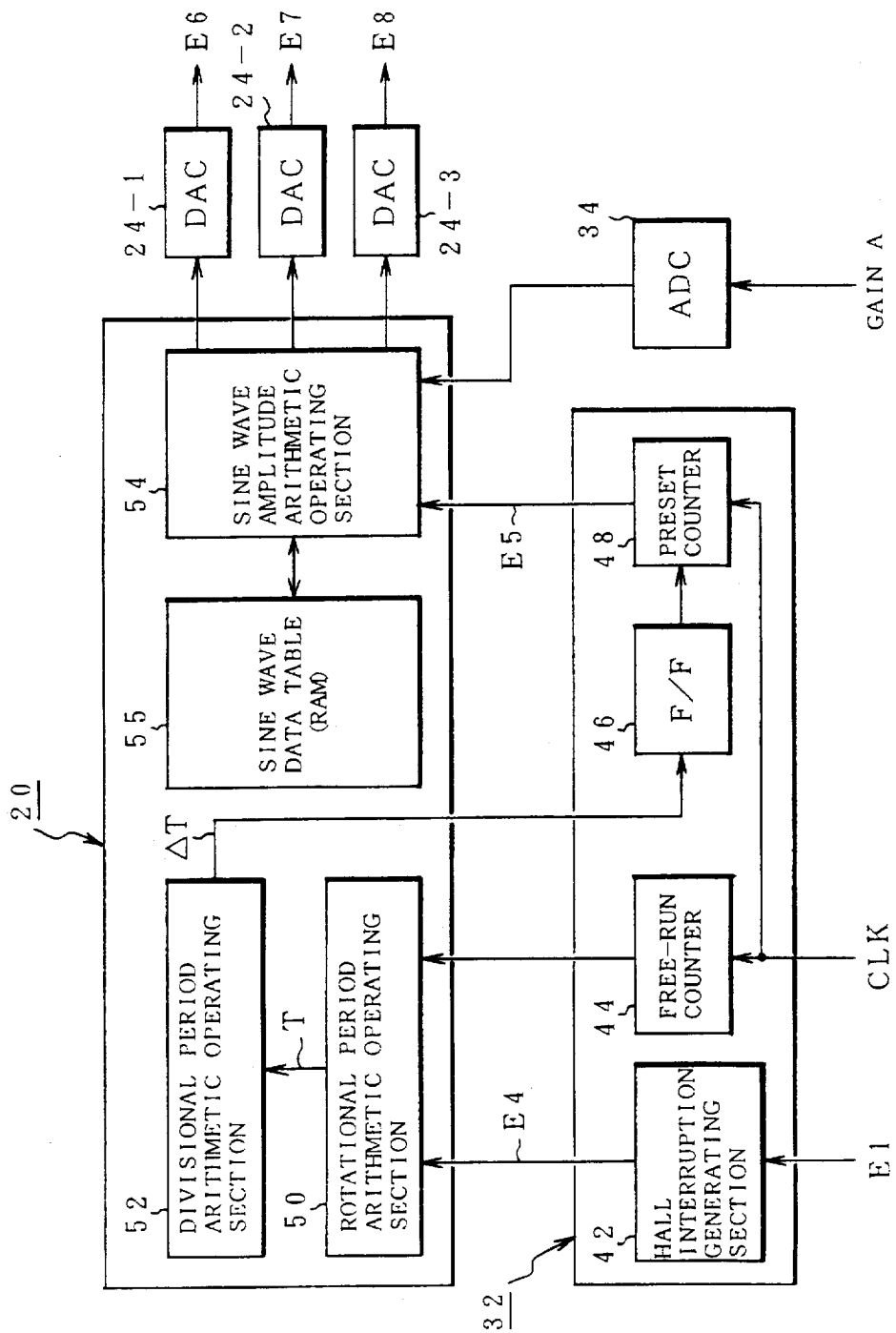
FIG. 2 is a block diagram of a timing generating circuit and a motor control section in FIG. 1.

FIG. 2 shows the details of the sine wave amplitude modulating section 20 provided for the motor control section 18 in FIG. 1 together with the timing generating circuit 32. A Hall interruption generating section 42, a free-run counter 44, a flip-flop 46, and a preset counter 48 are provided for the timing generating circuit 32. On the other hand, a rotational period arithmetic operating section 50, a divisional period arithmetic operating section 52, a sine data table 55, and a sine wave amplitude arithmetic operating section 54 are provided for the sine wave amplitude modulating section 20 on the motor control section 18 side. The Hall signal E1 from only one Hall element 16-1 provided for the brushless DC motor 10 is inputted to the Hall interruption generating section 42. The Hall interruption generating section 42 detects a leading edge of the Hall signal E1 which is synchronized with one rotation of the motor and outputs a Hall interruption signal E4 to the rotational period arithmetic operating section 50. Simultaneously, an output of the free-run counter 44 is also supplied to the rotational period arithmetic operating section 50. When the Hall interruption signal E4 is obtained, the rotational period arithmetic operating section 50 latches the value of the free-run counter 44. Every time the counter value is latched, a rotational period (T) is obtained by subtracting the counter value latched by the previous interruption from the present counter value. The rotational period (T) obtained by the rotational period arithmetic operating section 50 is supplied to the divisional period arithmetic operating section 52 and a divisional period ΔT is obtained by dividing the rotational period (T) by the number (N) of sine wave amplitude values which are generated per one rotation of the motor. For example, it is now assumed that N=24 division. The value of the divisional period ΔT obtained by the divisional period arithmetic operating section 52 is stored as a preset value into the preset counter 48 through the flip-flop 46. The preset counter 48 counts the number of clocks and presets. When the count value coincides with the value of the divisional period ΔT, the preset counter 48 outputs an interruption signal E5 to the sine wave amplitude arithmetic operating section 54. In the embodiment, since the divisional period arithmetic operating section 52 obtains the divisional period ΔT obtained by dividing the rotational period (T) by (N=24), the preset counter 48 outputs the interruption signal E5 every time the rotational angle of the motor advances by 15°. Sine data is stored into the sine data table 55 every rotation θ which is determined by the division number (N) of one rotation. For example, now assuming that the angle which is obtained by dividing one rotation by (N=24) is equal to θ, values of sinθ, sin2θ, sin3θ, ..., and sin24θ have preliminarily been stored in the sine data table 55. Every time the interruption signal E5 is received from the preset counter 48, the sine wave amplitude arithmetic operating section 54 sequentially reads out the corresponding data of the 24 sine data stored in the sine data table 55. Simultaneously, the gain (A) as an amplitude gain of the drive signal E21 of the activation control section 36 obtained from the A/D converter 34 is fetched. The sine data is multiplied with the gain (A), thereby obtaining the sine amplitude value. The obtained sine amplitude value is sequentially outputted with a phase difference of 60° to the D/A converters 24-1 to 24-3.

Figure 3:
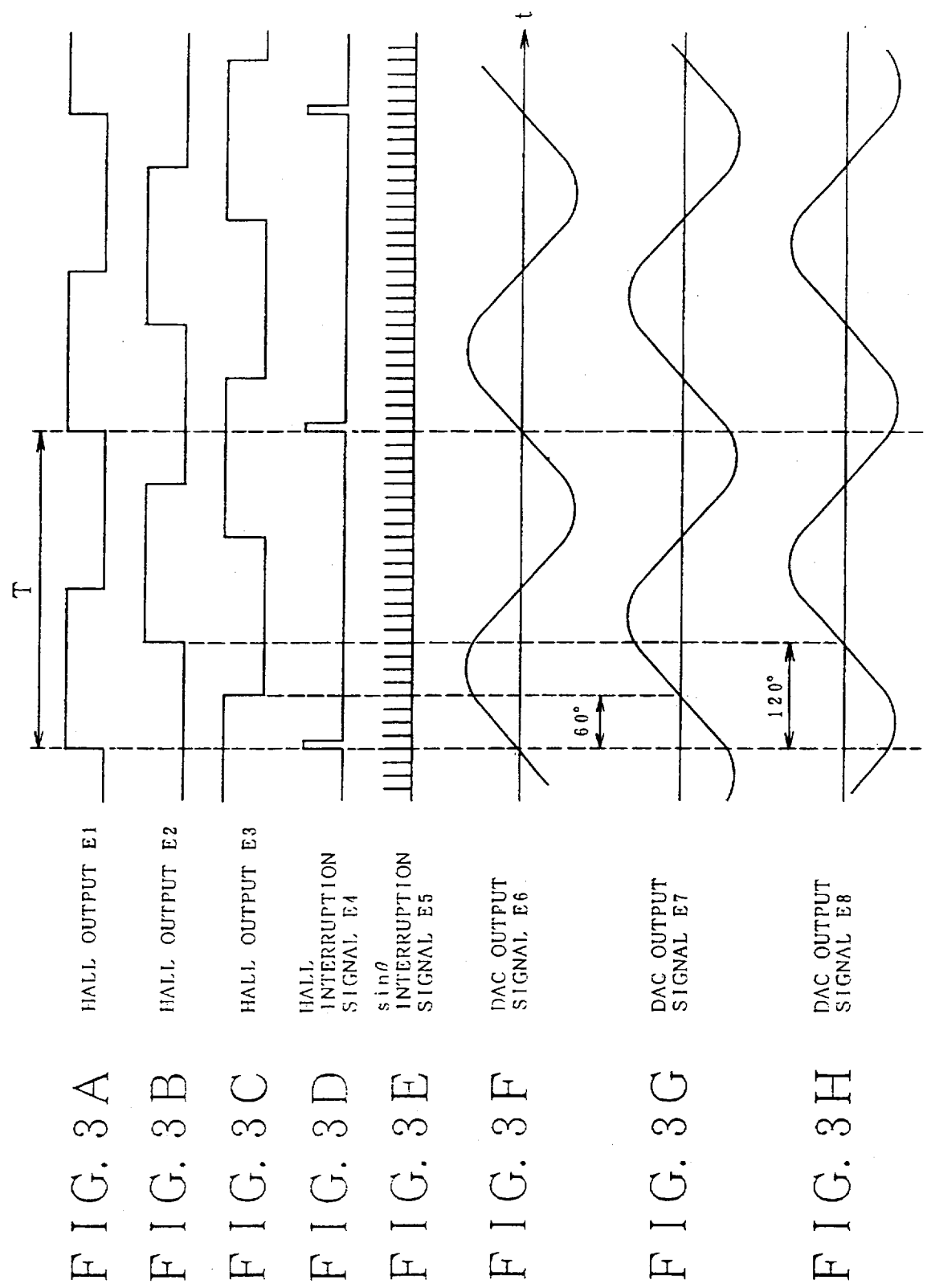
FIGS. 3A to 3H are timing charts for three Hall signals in FIG. 1 and sine wave amplitude modulation signals of three phases which are generated in an amplitude modulation in FIG. 2.

FIGS. 3A, 3B, and 3C show the Hall signals E1, E2, and E3 from the three Hall elements 16-1 to 16-3 provided for the brushless DC motor 10. The timing generating circuit 32 uses only the Hall signal E1 of FIG. 3A among them and generates the Hall interruption signal E4 of FIG. 3D. The reason why only one Hall element 16-1 is used is because there is an advantage such that an attaching error of each Hall element in the brushless DC motor 10 can be cancelled. On the basis of the Hall interruption signal E4 of FIG. 3D, the rotational period (T) is detected by the rotational period arithmetic operating section 50 and is further divided into (N=24) divisional periods ΔT by the divisional period arithmetic operating section 52. The divisional periods ΔT are preset into the preset counter 48. Therefore, the interruption signal E5 of FIG. 3E is generated every divisional period ΔT and 24 sine wave amplitude values are calculated per one rotation by the sine wave arithmetic operating section 54. The calculated signal is supplied to the D/A converter 24-1 and becomes the output signal E6 of FIG. 3F. The sine wave amplitude value which is delayed by 60° is supplied to the D/A converter 24-2. The sine wave amplitude value which is delayed by 120° is supplied to the D/A converter 24-3. As shown in FIGS. 3G and 3H, the output signal E7 which is delayed by 60° and the output signal E8 which is delayed by 120° are obtained, respectively.

FIG. 4 shows an embodiment of the separating circuit 26-1 shown in FIG. 1. The other remaining separating circuits 26-2 and 26-3 also have the same circuit construction. An outflow side separating circuit section having operational amplifiers 60 and 72 is provided subsequent to an input terminal 56 to which the output signal E6 from the D/A converter 24-1 is applied. The outflow side separation output signal E10 is generated from an output terminal 82. An inflow side separating circuit section having operational amplifiers 90 and 94 is provided for the input terminal 56. The inflow side separation output signal E11 is outputted to an output terminal 104.

Figure 5A:
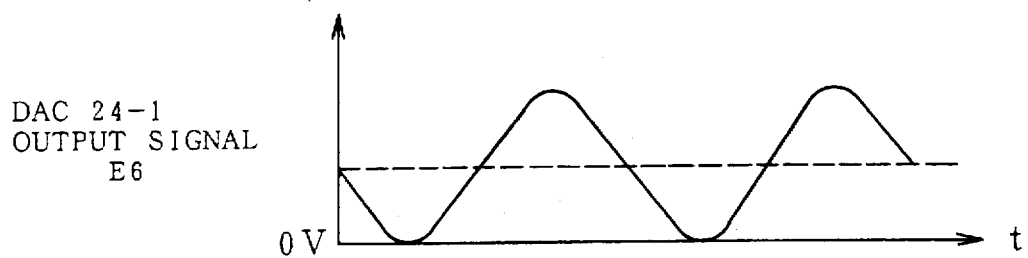
FIGS. 5A and 5B are timing charts showing output signal waveforms of the separating circuit in FIG. 4.
Figure 5B:
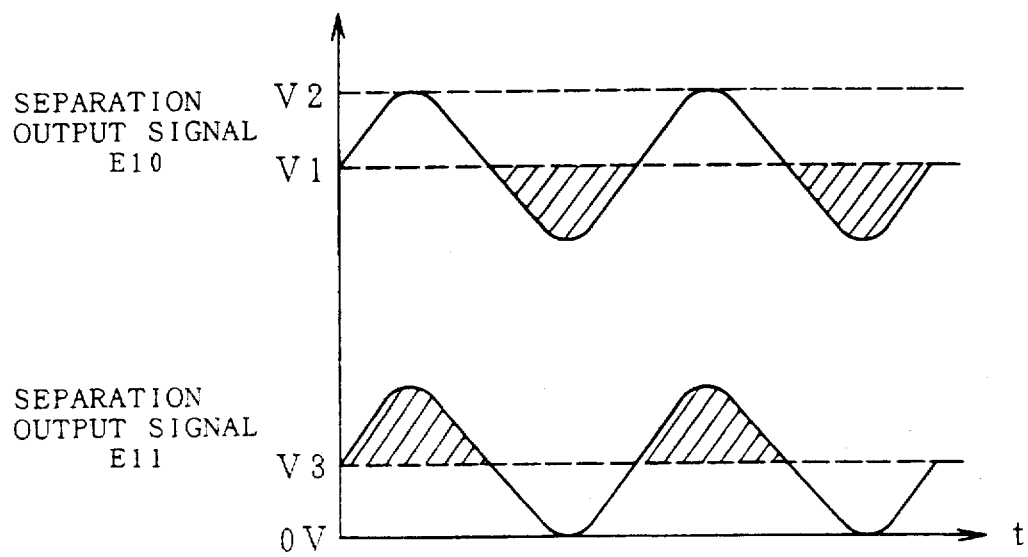

FIG. 5A shows the output signal E6 from the D/A converter 24 to the input terminal 56. FIG. 5B shows the outflow side separation output signal E10 and inflow side separation output signal E11. In order to obtain the separation output signal E10 on the outflow side, a specified voltage V1 is applied from a terminal 64 of the operational amplifier 60, thereby biasing the middle-point level of the input signal as shown in FIG. 5A.

A specified voltage V2 is applied from a terminal 74 to the operational amplifier 72 on the second stage, thereby deciding the amplitude upper-limit level of the separation output signal E10 on the outflow side as shown in FIG. 5B. As a result, the input signal E6 from the input terminal 56 is converted into the separation output signal E10 on the outflow side in which the amplitude upper limit is set to the specified voltage V2 around the specified voltage V1 as a center. On the other hand, with respect to the operational amplifiers 90 and 94 side to obtain the separation output signal E11 on the inflow side, a specified voltage V3 is set to a terminal 96 on the inflow side of the operational amplifier 94. The specified voltage V3 sets the middle-point level of the separation output signal E11 on the inflow side as shown in FIG. 5B. Therefore, the signal E6 to the input terminal 56 becomes the in-phase sine wave signal which changes around the specified voltage V3 as a center. The separation output signal E10 on the outflow side in FIG. 5B controls the conduction of the P-channel FET on the outflow side provided in the drive circuit at the next stage for a period of time shown by a hatched portion of the half cycle below the specified voltage V1. The separation output signal E11 on the inflow side controls the conduction of the N-channel FET on the inflow side provided in the drive circuit 40 for a period of time of the half cycle shown by a hatched portion exceeding the specified voltage V3.

Figure 6:
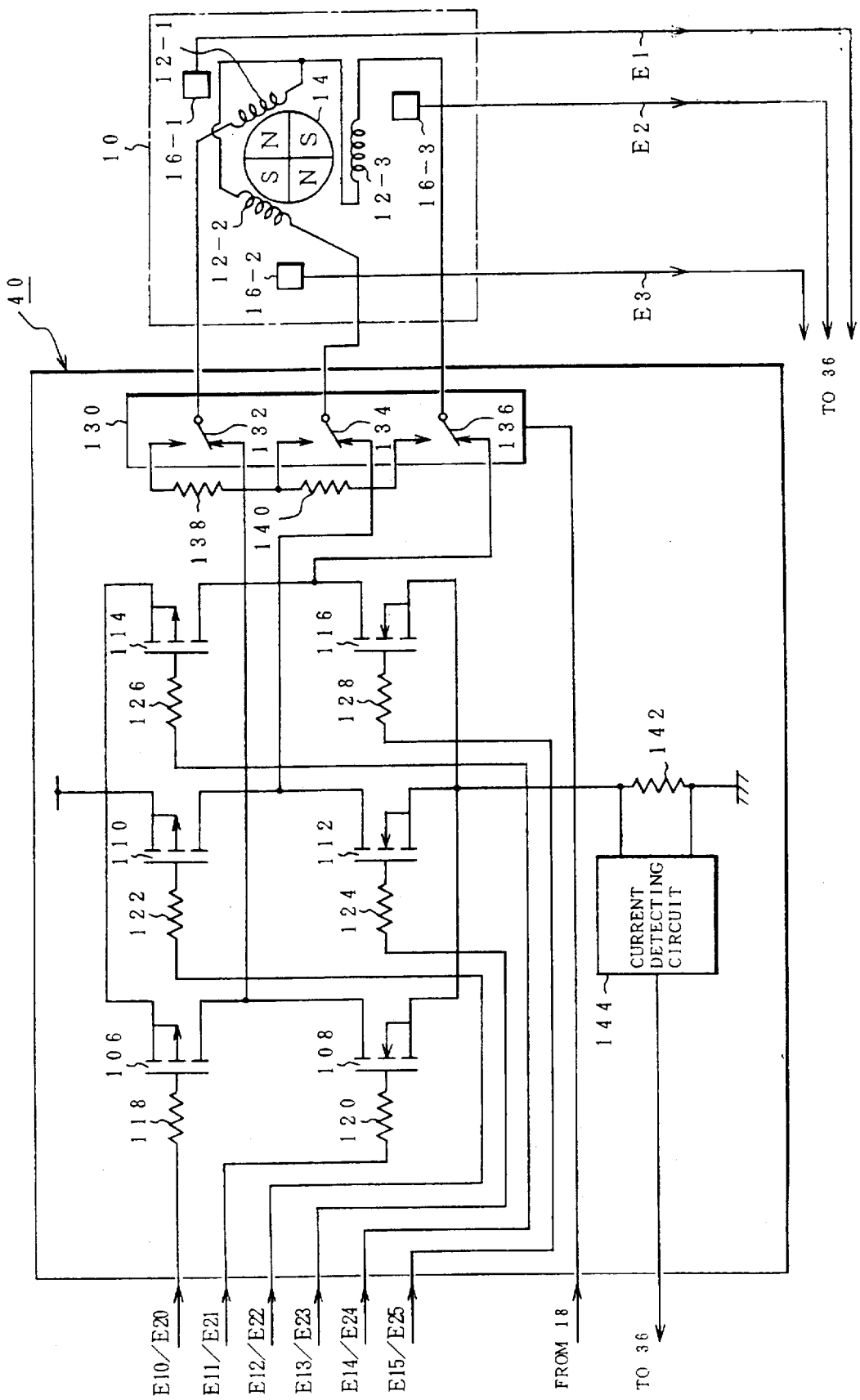
FIG. 6 is a circuit diagram of an embodiment of a drive circuit in FIG. 1.
Figure 7:
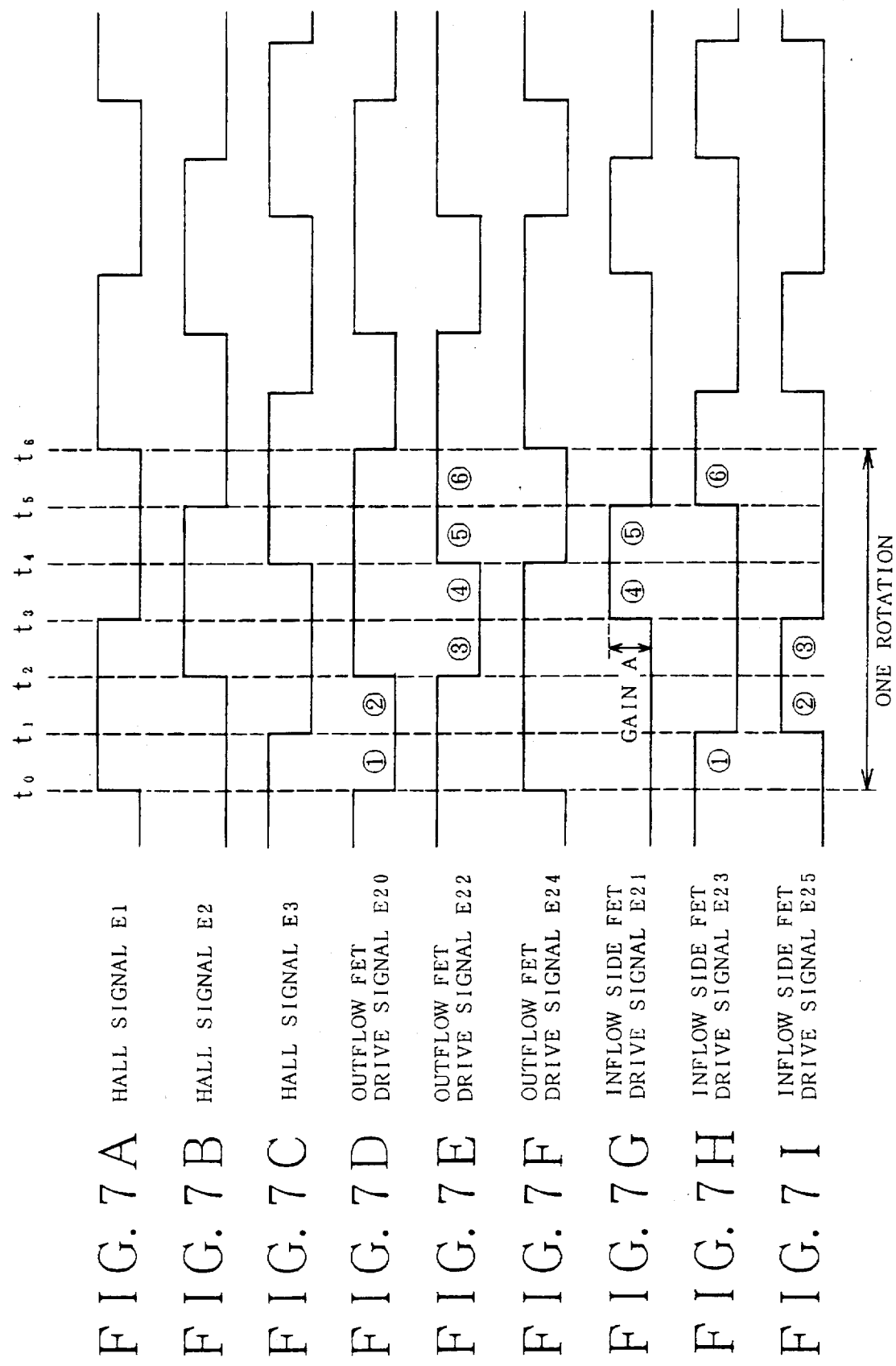
FIGS. 7A to 7I are timing charts for pulse amplitude modulation signals of three phases which are generated in an activation control section on the basis of three Hall signals.

FIG. 6 shows an embodiment of the drive circuit 40 in FIG. 1. A serial circuit of a P-channel FET 106 and an N-channel FET 108, a serial circuit of a P-channel FET 110 and an N-channel FET 112, and a serial circuit of a P-channel FET 114 and an N-channel FET 116 are connected in parallel to the drive circuit 40 like a ladder between a power source line 146 and the ground. A connection point between the P-channel FET 106 and the N-channel FET 108 is connected to one end of the stator coil 12-1 of the brushless DC motor 10 through a regenerative brake switching circuit 130. A connection point between the P-channel FET 110 and the N-channel FET 112 is connected to one end of the stator coil 12-2 of the brushless DC motor 10 through the regenerative brake switching circuit 130. Further, a connection point between the P-channel FET 114 and the N-channel FET 116 is connected to one end of the stator coil 12-3 of the brushless DC motor 10 through the regenerative brake switching circuit 130. The amplitude modulation signals E10, E11, E12, E13, E14, and E15 from the switching circuit 28 are inputted to gates of the FETs 106, 108, 110, 112, 114, and 116 through resistors 118, 120, 122, 124, 126, and 128, respectively. Further, the ground side of the N-channel FETs 108, 112, and 116 are commonly connected and are connected to the ground through a current detecting resistor 142. A drive current flowing to the current detecting resistor 142 is detected by a current detecting circuit 144 as a voltage signal and is outputted as a detection signal of the drive current to the activation control section 36 in FIG. 1. In this instance, when the P-channel FETs 106, 110, and 114 are made conductive by the driving by the amplitude modulation signals E10, E11, and E12, they supply a current to the stator coils of the brushless DC motor 10, the FETs 106, 110, and 114 operate as an outflow side. On the other hand, the N-channel FETs 108, 112, and 116 provided on the lower side fetch the current flowing in the stator coils of the brushless DC motor 10 and supply the current to the ground side. Therefore, the FETs 108, 112, and 116 operate as an inflow side.

The regenerative brake switching circuit 130 has analog switches 132, 134, and 136. The analog switches 132, 134, and 136 are closed on the (a) side as shown in the diagram when the motor is activated and when it is in the stationary state. When the switching circuit 130 receives a switching signal for a stop control from the motor control section 18, the switches are switched to the (b) side, the three stator coils 12-1 to 12-3 are mutually connected through resistors 138 and 140, thereby allowing an electric power to be consumed and realizing the regenerative braking operation. The operation of the drive circuit 40 in FIG. 6 is controlled by the pulse amplitude modulation signals E20 to E25 from the activation control section 36 at the time of the activation and is controlled by the sine wave amplitude modulation signals E10 to E15 from the separating circuits 26-1 to 26-3 after the activation.

FIGS. 7A to 7I show the switching operation of the drive circuit 40 by the activation control section 36 in FIG. 1 together with the Hall signals. In this instance, a period of time between t0 to t6 indicates one rotation of the motor. One rotation is divided into six intervals and the switching operation is executed for such an interval.

First, in a period of time from t0 to t1, the drive signal E20 to the outflow side P-channel FET 106 is effective and simultaneously the signal to the inflow side N-channel FET 112 is made effective. Those signals are shown by ① in the timing charts. The drive current from the P-channel FET 106, therefore, flows in a path such that after the current was supplied from the stator coil 12-1 to the stator coil 12-2, it returns to the N-channel FET 112. In the next period between time t1 and time t2, as shown by ② in the timing charts, the outflow side drive signal E20 is still effective. On the inflow side, the drive signal E25 is made effective. In a state in which the P-channel FET 106 is ON, the N-channel FET 116 is switched to an ON-state. Therefore, the current supplied from the P-channel FET 106 passes in the stator coil 12-1 and, after that, it flows in the stator coil 12-3 and is returned to the N-channel FET 116. With respect to each of the other remaining intervals among t2 to t6, as shown by ③, ④, ⑤, and ⑥, one of the outflow side FETs and one of the inflow side FETs are turned on, thereby supplying drive currents to the corresponding two stator coils in the brushless DC motor 10. A rotational magnetic field is generated by the switching of the stator coils and the rotor 14 is rotated by being influenced by the rotational magnetic field. The amplitudes of the three pulse amplitude modulation signals E21, E23, and E25 in FIG. 7 which are supplied to the outflow side FETs are controlled by the square wave pulse amplitude modulating section 38 in FIG. 1 in accordance with transfer functions.

Figure 8:
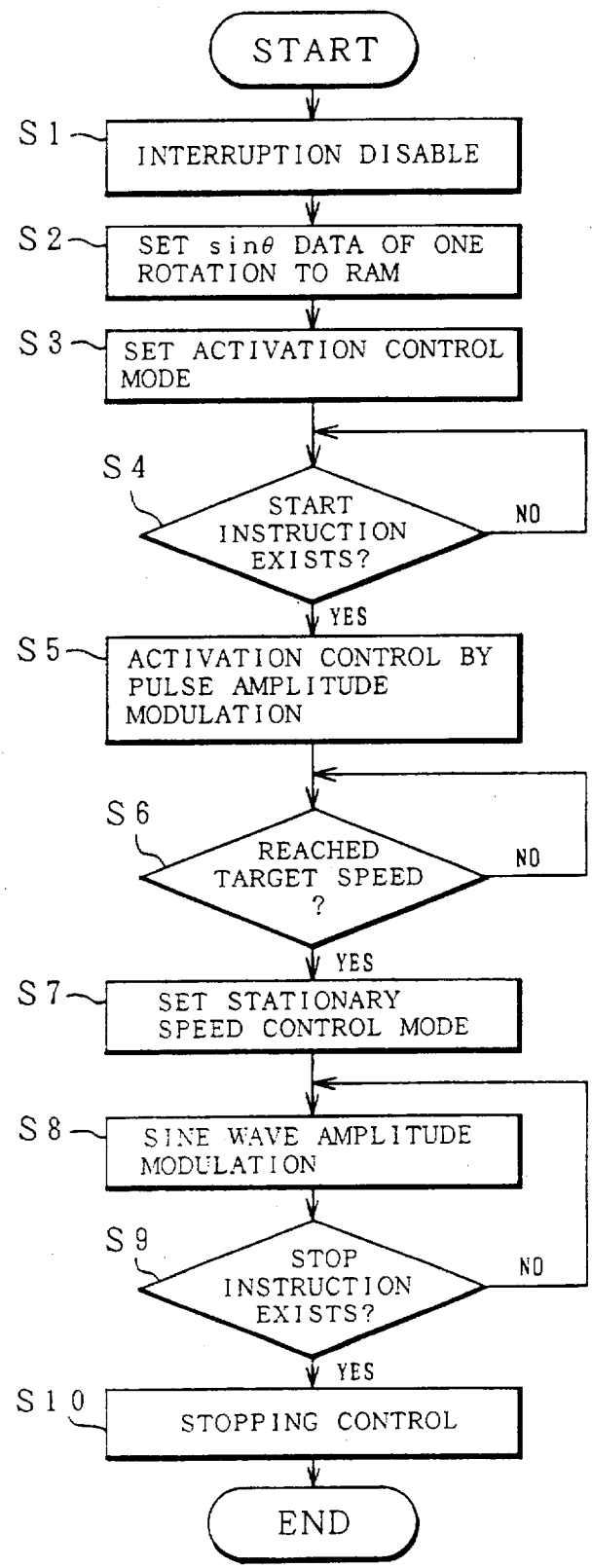
FIG. 8 is a flowchart for a main routine by a motor control section in FIG. 1.

A whole processing operation by the motor control section 18 in FIG. 18 will now be explained with reference to a flowchart of FIG. 8. When a power source is turned on, initial processes shown in steps S1 to S3 are executed by the motor control section 18. In step S1, an interruption disable state to suppress an interruption from the timing generating circuit 32 is set. Subsequently, step S2 follows and the 24-divided sine data $sin\theta$, $sin2\theta$, . . . , and $sin24\theta$ of one rotation are set into a sine data table of an RAM. In step S3, the operation of the sine wave amplitude modulating section 20 provided for the motor control section 18 is suppressed and an activation control mode to enable the activation by the activation control section 36 is set. By setting the activation control mode, the analog switches 30-1 to 30-6 of the switching circuit 28 are switched to the (b) side. The apparatus subsequently waits for a start instruction in step S4. The start instruction to the motor control section 18 is executed by a start command from an upper apparatus through the upper interface section 22. It is also possible to instruct such a start by a switching operation of the apparatus in addition to the start command. When the presence of the start instruction is judged in step S4, the processing routine advances to step S5 and the activation control of the brushless DC motor 10 by the pulse amplitude modulating section 38 provided for the activation control section 36 is executed. The motor rotation by the activation control is monitored by the activation control section 36. When it is judged that the rotational speed reaches the target speed, a speed lock signal is outputted to the motor control section 18. When the speed lock signal is obtained, therefore, the motor control section 18 recognizes that the rotational speed reached the target speed in step S6. The processing routine advances to step S7 and a stationary speed control mode is set. In the stationary speed control mode, the sine wave amplitude modulating section 20 in the motor control section 18 is made effective and, simultaneously, the analog switches 30-1 to 30-6 of the switching circuit 28 are switched to the (a) side. In subsequent step S8, the sine wave amplitude modulating section 20 is subjected to the interruption of the detection of the rotational period and the amplitude value generating timing based on the interruption from the timing generating circuit 32 and calculates sine wave amplitude data on the basis of the gain (A) which is decided by the drive signal E21 obtained in this instance from the activation control section 36 through the A/D converter 34. The sine wave amplitude data is outputted to the A/D converters 24-1 to 24-3 so as to have a phase delay of 60° between the respective data and is converted into the sine wave amplitude modulation signals. Those signals are transmitted through the separating circuits 26-1 to 26-3 and the drive circuit 40, thereby driving the brushless DC motor 10. During the stationary control by the sine wave amplitude modulation in step S8, the presence or absence of a stop instruction is checked in step S9. When the stop is instructed by the stop command from the upper apparatus or the switch-off, step S10 follows. The motor control section 18 switches the regenerative brake switching circuit 130 provided for the drive circuit 40 in FIG. 6 to the (b) side, thereby performing the regenerative brake. The brushless DC motor 10 is braked and stopped and a series of processes are finished.

Figure 9:
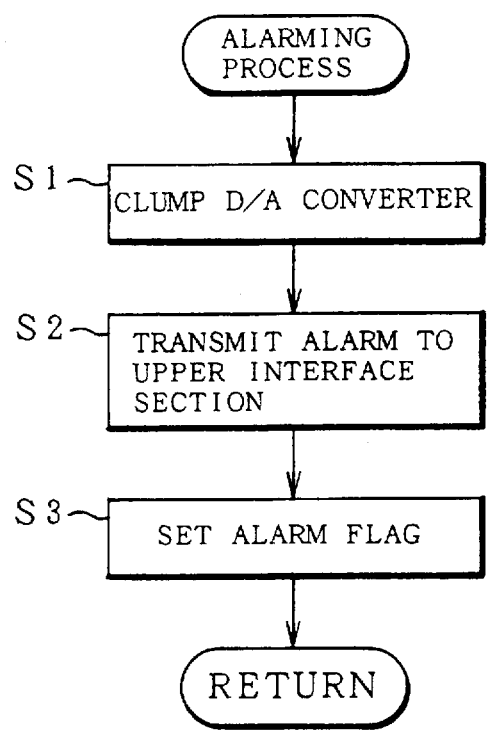
FIG. 9 is a flowchart for an alarming process which is executed in an interrupting process by the motor control section in FIG. 1.

FIG. 9 shows an alarming process which is executed as a subroutine by the motor control section 18. An error occurrence during the control of the brushless DC motor 10 is monitored by the activation control section 36. The activation control section 36 monitors, for example, an overcurrent, a lock time-out when a time which is required to obtain a speed lock signal exceeds a specified time at the time of the activation control, a coil disconnection, and the like. When such errors are detected, an error interruption is performed to the motor control section 18. The motor control section 18 which was subjected to the error interruption clumps to stop the outputs of the D/A converters 24-1 to 24-3 in step S1. In subsequent step S2, an alarm as status information is transmitted to the upper apparatus through the upper interface section 22. In step S3, an alarm flag is set and the processing routine is returned to the main routine of FIG. 9. The upper apparatus side which received the alarm generates a stop command as necessary, thereby performing the stop control.

Figure 10:
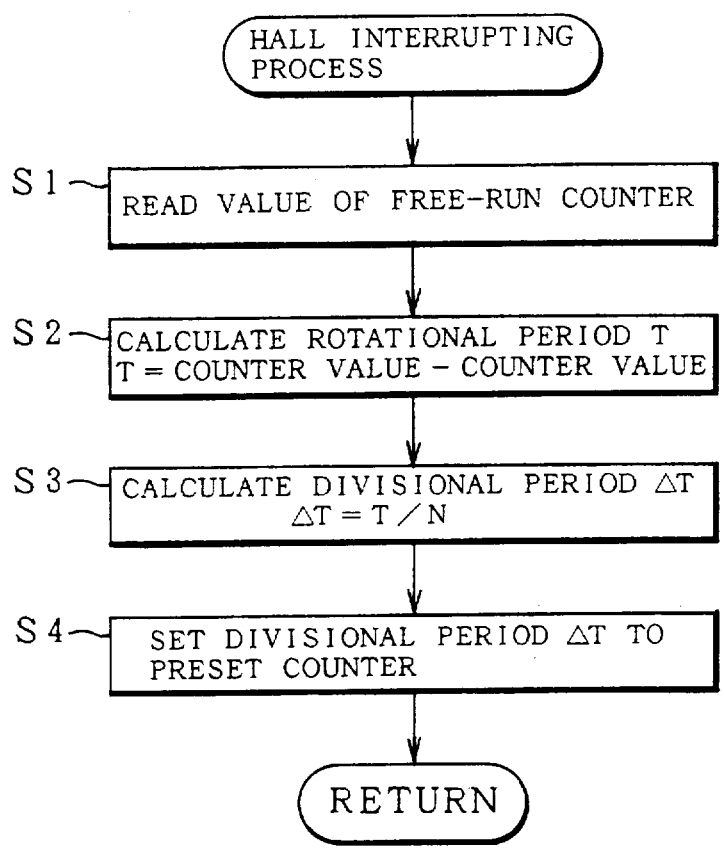
FIG. 10 is a flowchart for a Hall interrupting process which is executed in the interrupting process by the motor control section in FIG. 1.

A flowchart of FIG. 10 shows an interrupting process of the rotational period arithmetic operating section 50 and the divisional period arithmetic operating section 52 on the motor control section side for the Hall interruption signal E4 from the timing generating circuit 32 in FIG. 2. When the Hall interruption signal E4 is received from the Hall interruption generating section 42, the interrupting routine is started. First in step S1, the value of the free-run counter 44 is read. In step S2, the value of the rotational period (T) is calculated by subtracting the preceding counter value from the counter value at this time. In step S3, the rotational period (T) is divided by the predetermined dividing number (N) (for example N=24), thereby calculating the divisional period ΔT. Finally in step S4, the value of the divisional period ΔT is set into the preset counter 48. Thus, a setting of the interruption timing to calculate the sine wave amplitude value on the basis of the gain (A), namely, a transmission of the interruption signal E5 is executed each time the disc rotates by 15° in the rotational period (T) obtained on the basis of the Hall signal E1.

Figure 11:
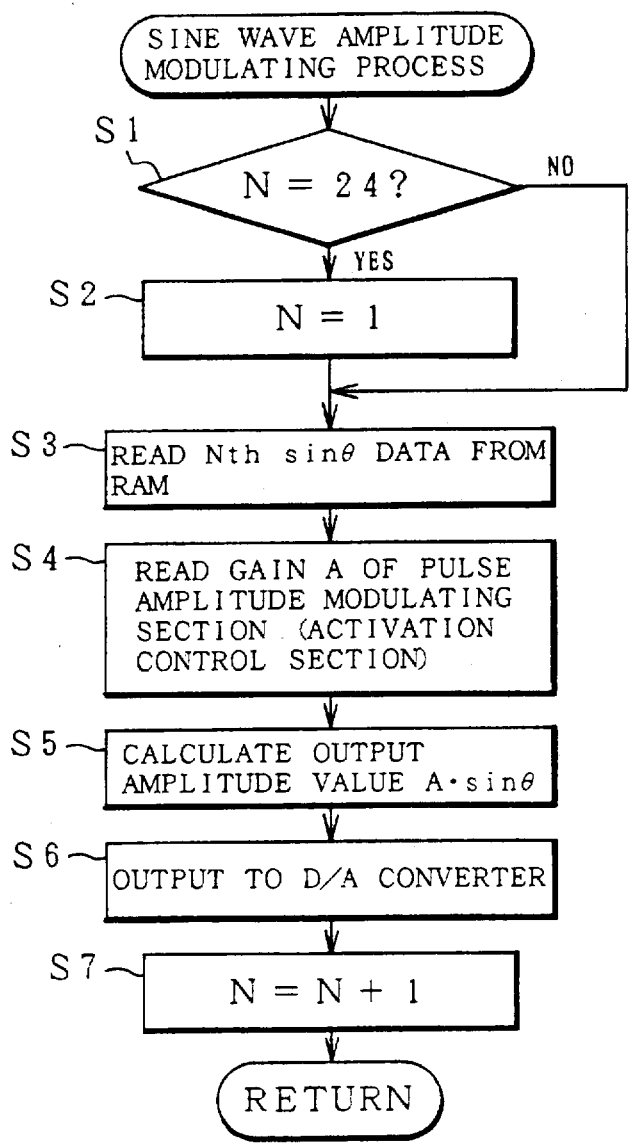
FIG. 11 is a flowchart for a sine wave amplitude modulating process which is executed in the interrupting process by the motor control section in FIG. 1.

A flowchart of FIG. 11 shows an interrupting routine of a sine wave outputting process by the sine wave amplitude arithmetic operating section 54 based on the interruption signal E5 from the preset counter 48 in FIG. 2. When the interruption signal E5 is outputted from the preset counter 48, the interrupting routine of FIG. 11 is executed. First in step S1, a check is made to see if a counter (N) indicative of the dividing number of one rotation has been set to (N=24) or not. In the beginning, the value of the counter (N) is set to one. When N≠24, step S3 follows and sinθ data of the (N=1)th set is read out from the sine data table 55. Subsequently in step S4, the amplitude of the pulse amplitude modulation signal E21 outputted from the square wave pulse amplitude modulating section 38 of the activation control section 36 is read out as a gain (A) by the A/D converter 34. In step S5, the value of sinθ read out in step S3 and the value of the gain (A) read out in step S4 are multiplied, thereby calculating the sine wave amplitude data. In step S6, the calculated data is outputted to the D/A converters. As for the outputs to the D/A converters, at the time point of the calculation of the sine wave amplitude data, the sine wave amplitude data is first outputted to the D/A converter 24-1, the same sine wave amplitude data is outputted to the D/A converter 24-2 at the timing which is deviated by 60° from the calculation time point and is further outputted to the D/A converter 24-3 at the timing deviated by 120°. Specifically speaking, since the sine wave amplitude modulation signals of three phases are deviated from each other by up to 120°, a shift register to hold eight sine wave amplitude data calculated at intervals of 15° is provided. It is sufficient to output the data from the first stage of the shift register to the first D/A converter 24-1 to output the data, from the fourth shift stage which elapsed by 60° to the second D/A converter 24-2, and further, to output the data from the eighth shift stage which elapsed by 120° to the D/A converter 24-3. The invention is not limited to the shift register but it is also possible to sequentially output the continuous eight sine wave amplitude data at intervals of 60° to the D/A converters 24-1 to 24-3 by using a stack memory such as an FIFO memory or the like. After the calculated sine wave amplitude data was outputted to the D/A converters in step S6, the value of the counter (N) is increased by one in step S7, the processing routine is returned to the main routine, and the apparatus waits for the next interruption by the interruption signal E5. The value of the counter (N) is set to (N=24) in a state in which the sine wave outputting process by the interrupting process of one rotation is finished. In the sine wave amplitude modulating process by the first interruption of the next one rotation, therefore, (N=24) is judged in step S1 and the counter value is initialized to (N=1) in step S2. After that, the arithmetic operating process of the sine wave amplitude data by the reading of the first sinθ data is repeated in steps S3 to S7.

According to the invention as mentioned above, a brushless DC motor which was sine wave polarized is driven by the sine wave amplitude modulation signal so as to obtain a specified speed, thereby perfectly eliminating the generation of a torque ripple which occurred by the driving by the pulse amplitude modulation signal. The motor driving of a low vibration can be realized. Since the motor is driven by the sine wave amplitude modulation signal, noises by the switching in the drive circuit are not generated and the S/N ratio of the apparatus to which the invention is applied can be improved. Further, although the motor is driven by the sine wave amplitude modulation signal, the timing for generation of the sine wave generation can be controlled by the Hall element built in the motor without using an encoder. In addition, with respect to a control gain, the pulse amplitude modulating circuit used for the activation control is used for a gain sensor, the amplitude of the pulse amplitude modulation signal is regarded as a gain of the sine wave amplitude modulation, and the sine wave amplitude data is obtained. Therefore, the construction of the apparatus is extremely simplified and the costs can be reduced.

In the above embodiment, the interruption occurrence based on the Hall element 16-1 of the brushless DC motor 10 and the interruption occurrence to produce the timing obtained by dividing the rotational period by (N) have been realized by the timing generating circuit 32 provided as an external circuit in order to simplify the motor control section 18 using the digital signal processor. Such an interruption occurrence, however, can be also realized by a program control of the digital signal processor.

Although the pulse amplitude modulating circuit has been used as an activation control section as an example, a proper pulse modulating circuit can be used so long as a control gain can be detected from the pulse modulation signal which is outputted. For example, a pulse width modulating circuit can be also provided in place of the pulse amplitude modulating circuit. In the pulse width modulating circuit, the control gain is controlled as an on-duty of the pulse width modulation signal. It is, therefore, sufficient to fetch the pulse width change of the on-pulse of the pulse width modulation signal as a gain A to the sine wave amplitude modulating section 20 by the A/D converter 34.

Further, although the motor control circuit of the invention intends to control the spindle motor which is used in a disk medium tester, a head testing apparatus, a servo track writing apparatus, or the like which is used in a production line of the magnetic disk unit, it can be also applied as it is to a spindle motor of a proper apparatus in which a low vibration, low noises, and low costs are required. The brushless DC motor is not limited to three phases and four poles but a proper brushless DC motor of three phases and eight poles, three phases and twelve poles, or the like can be also used.

What is claimed is:

1. A motor control apparatus comprising:
   a brushless DC motor of (m) phases and (n) poles;
   a rotation detecting section for detecting a rotation of said DC motor;
   a gain detecting section which has a pulse amplitude modulating circuit for obtaining a control gain to maintain a specified speed on the basis of rotation detection signals from (m) Hall elements provided in correspondence to stator coils of (m) phases of said DC motor and outputting pulse amplitude modulation signals of (m) phases in accordance with said control gain, said gain detecting section detecting said control gain to maintain said DC motor at a specific rotational speed from an amplitude of one of said pulse amplitude modulation signals of (m) phases that are outputted from said pulse amplitude modulation circuit; and
   a sine wave amplitude modulating section for outputting sine wave amplitude modulation signals of (m) phases whose amplitudes were modulated on the basis of said detected rotational speed of said rotation detecting section and said detected control gain of said gain detecting section to said DC motor, thereby controlling the rotational speed of said DC motor to said specified speed.

2. An apparatus according to claim 1, wherein said DC motor has a rotor in which (n) magnetic poles having a sine wave distribution are formed.

3. An apparatus according to claim 1, wherein said DC motor has (m) Hall elements in correspondence to stator coils of (m) phases and said rotation detecting section detects a motor rotational speed by using one of said (m) Hall elements.

4. An apparatus according to claim 1, wherein when said DC motor is activated, a switching circuit selects an output of said pulse amplitude modulating circuit for an activation time period, thereby controlling said DC motor during said activation time period, and when said rotational speed reaches a specified rotational speed at the end of said activation time period, said switching circuit selects an output of said sine wave amplitude modulating circuit, thereby maintaining said DC motor at said specified speed.

5. An apparatus according to claim 1, wherein said sine wave amplitude modulating section comprises:

a rotational period arithmetic operating section for calculating a rotational period (T) of said DC motor on the basis of a detection signal (E1) of said rotation detecting section;

a divisional period arithmetic operating section for obtaining a divisional period ($\Delta T$) by dividing said rotational period (T) by a predetermined number (N);

a sine data storing section in which sine data ($\sin\theta$ to $\sin N.\theta$) of every rotational angle ($\theta$) obtained by dividing a rotational angle of one rotation by said predetermine number (N) is preliminarily stored;

a sine wave amplitude arithmetic operating section for sequentially reading out said sine data ($\sin\theta$ to $\sin N.\theta$) from said sine data storing section every time said divisional period ($\Delta T$) elapses and multiplying said read sine data with said detected control gain of said gain detecting section, thereby obtaining sine wave amplitude data ($A.\sin\theta$ to $A.\sin N.\theta$), and for outputting said sine wave amplitude data to each of said stator coils with a phase deviation of ($\pi/m$);

D/A converting sections of (m) phases for converting said sine wave amplitude data from said sine wave amplitude arithmetic operating section into analog signals;

separating sections of (m) phases for separating each of said analog signals into two sine wave amplitude modulation signals; and a driving section in which switch circuits of (m) phases each of which is constructed by serially connecting a pair of switching elements of different operation polarities connected in parallel between power source lines, said driving section driving said switching elements so that each of said stator coils produces a rotational magnetic field by a combination of said two sine wave amplitude modulation signals from said separating sections.

6. An apparatus according to claim 5, wherein said rotational period arithmetic operating section includes a rotation interruption generating section for detecting one rotation by said rotation detecting section and outputting an interruption signal and a counter section for continuously counting clock signals, said counter value is latched every time said interruption signal is obtained and the rotational period (T) is obtained as a difference between the counter value which was latched at the previous time and the counter value which is latched at this time.

7. An apparatus according to claim 5, wherein said divisional period arithmetic operating section has a preset counter section in which said divisional period ($\Delta T$) is preset and which instructs said sine wave amplitude arithmetic operating section to start the arithmetic operation every time the count value of said clocks reaches said preset value.

8. An apparatus according to claim 1, wherein said sine wave amplitude modulating section is constructed by a digital signal processor and said pulse amplitude modulating circuit is constructed by an exclusive-use LSI.

9. An apparatus according to claim 8, wherein said digital signal processor switches a switching circuit to the activation side when a start command is received from an upper apparatus, thereby activating said DC motor by said pulse amplitude modulating circuit, switches said switching circuit to the opposite side when the arrival to the specified rotational speed is recognized after the activation, thereby driving said DC motor by an output of said sine wave amplitude modulating section, and further stops said DC motor when a stop command is received from the upper apparatus.

10. A motor control method comprising:

a rotation detecting step for detecting a rotational speed of a brushless DC motor of (m) phases and (n) poles;

a control gain arithmetic operating step for calculating a control gain to maintain a specified rotational speed on the basis of rotational speed detection signals from (m) Hall elements provided in correspondence to stator coils of (m) phases of said DC motor;

a pulse amplitude modulation signal forming step for forming pulse amplitude modulation signals of (m) phases which are supplied to said DC motor in accordance with said control gain;

a gain detecting step for detecting said control gain from an amplitude of one of said pulse amplitude modulation signals of (m) phases to maintain said DC motor at a specified rotational speed; and a controlling step for outputting sine wave amplitude modulation signals of (m) phases which are amplitude modulated on the basis of the motor detection rotational speed detected in said rotation detecting step and said detected control gain detected in said gain detecting step, thereby controlling said rotational speed of said DC motor at the specified speed.

11. A method according to claim 10, wherein said DC motor has a rotor in which (n) magnetic poles having a sine wave distribution are formed.

12. A method according to claim 11, wherein said DC motor has (m) Hall elements in correspondence to stator coils of (m) phases and one of said (m) Hall elements is used for said rotation detection.

13. A method according to claim 11, wherein said DC motor is activation controlled by switching to said pulse amplitude modulation signals at the time of the activation, and when the rotational speed reaches said specified speed during said activation control, said DC motor is controlled to said specified speed by switching to said sine wave amplitude modulation signal.

14. A method according to claim 11, wherein in said controlling step, sine data ($\sin\theta$ to $\sin N.\theta$) of every rotational angle ($\theta$) which is obtained by dividing a rotational angle of one rotation by a predetermined number (N) is preliminarily stored;

a rotational period (T) is calculated on the basis of a rotation detection signal (E1) of said Dc motor;

a divisional period ($\Delta T$) is obtained by dividing said motor rotational period (T) by said predetermined number (N);

each time said divisional period ($\Delta T$) elapses, said sine data ($\sin\theta$ to $\sin N.\theta$) stored is sequentially read out and multiplied with said detection gain, thereby obtaining sine wave amplitude data ($A.\sin\theta$ to $A.\sin N.\theta$), said sine wave amplitude data is outputted to each of said stator coils of (m) phases with a phase deviation of ($\pi/m$);

said sine wave amplitude data to each of said stator coils is converted into an analog signal;

each of said analog signals to each of said stator coils is separated to two sine wave amplitude modulation signals; and switching circuits of (m) phases each of which is constructed by serially connecting a pair of switching elements of different operation polarities are connected in parallel between power source lines, and said switching elements are driven so that each of said stator coils produces a rotational magnetic field by a combination of said two sine wave amplitude modulation signals from said separating step.

15. A method according to claim 14, wherein a signal change of every one rotation of said DC motor is detected, thereby outputting an interruption signal, a value of a counter for continuously counting clocks is latched each time said interruption signal is derived, and said rotational period (T) is calculated from a difference between a counter value which was latched at the previous time and a counter value which is latched at this time.

16. A method according to claim 15, wherein said divisional period ($\Delta T$) is preset to said counter, the clocks are counted, a check is made to see if said divisional period ($\Delta T$) has elapsed or not each time said clock count value reaches a preset value, and the calculation of said sine wave amplitude data is instructed.

17. A motor control apparatus comprising:

a brushless DC motor of (m) phases and (n) poles;

a rotation detecting section for detecting a rotation of said DC motor;

a gain detecting section for detecting a control gain to maintain a rotational speed of said DC motor at a specified rotational speed;

a rotational period arithmetic operating section for calculating a rotational period (T) of said DC motor on the basis of a detection signal (E1) of said rotation detecting section;

a divisional period arithmetic operating section for obtaining a divisional period ($\Delta T$) by dividing said rotational period (T) by a predetermined number (N);

a sine data storing section in which sine data ($\sin\theta$ to $\sin N.\theta$) of every rotational angle ($\theta$), obtained by dividing a rotational angle of one rotation by said predetermine number (N), is preliminarily stored;

a sine wave amplitude arithmetic operating section for sequentially reading out said sine data ($\sin\theta$ to $\sin N.\theta$) every time said divisional period ($\Delta T$) elapses, and multiplying said read sine data with the control gain of said gain detecting section, thereby obtaining sine wave amplitude data ($A.\sin\theta$ to $A.\sin N.\theta$), and for outputting said sine wave amplitude data to each of said stator coils with a phase deviation of ($\pi/m$);

D/A converting sections of (m) phases for converting said sine wave amplitude data from said sine wave amplitude arithmetic operating section into analog signals;

separating sections of (m) phases for separating each of said analog signals into two sine wave amplitude modulation signals; and a driving section in which switch circuits of (m) phases each of which are constructed by serially connecting a pair of switching elements of different operation polarities connected in parallel between power source lines, said driving section driving said switching elements, so that each of said stator coils produces a rotational magnetic field by combining said two sine wave amplitude modulation signals from said separating sections.

18. An apparatus according to claim 17, wherein said rotational period arithmetic operating section includes a rotation interruption generating section for detecting one rotation by said rotation detecting section and outputting an interruption signal and a counter section for continuously counting clock signals, said counter value is latched every time said interruption signal is obtained and the rotational period (T) is obtained as a difference between the counter value which was previously latched and the counter value which is latched at this time.

19. An apparatus according to claim 17, wherein said divisional period arithmetic operating section has a preset counter section in which said divisional period ($\Delta T$) is preset and which instructs said sine wave amplitude arithmetic operating section to start the arithmetic operation every time the count value of said clocks reaches said preset value.

20. A motor control method comprising the steps of:

detecting a rotational speed of a brushless DC motor of (m) phases and (n) poles;

detecting a control gain to maintain said DC motor at a specified rotational speed;

preliminarily storing sine data ($\sin\theta$ to $\sin N.\theta$) of every rotational angle ($\theta$) which is obtained by dividing a rotational angle of one rotation of said DC motor by a predetermined number (N);

calculating a rotational period (T) on the basis of a rotation detection signal (E1) of said DC motor and obtaining a divisional period ($\Delta T$) by dividing said motor rotational period (T) by said predetermined number (N);

sequentially reading out said preliminarily stored sine data ($\sin\theta$ to $\sin N.\theta$) each time said divisional period ($\Delta T$) elapses, and multiplying said preliminarily stored sine data with said detected control gain, thereby obtaining sine wave amplitude data ($A.\sin\theta$ to $A.\sin N.\theta$), and outputting said sine wave amplitude data to each of a stator coils of (m) phases with a phase deviation of ($\pi/m$);

converting said sine wave amplitude data outputted to each of said stator coils into an analog signal;

separating each of said analog signals into two sine wave amplitude modulation signals; and connecting switching circuits of (m) phases, each of which is constructed by serially connecting a pair of switching elements of different operation polarities connected in parallel between power source lines and driving said switching elements so that each of said stator coils produces a rotational magnetic field by a combination of said two sine wave amplitude modulation signals.

21. A method according to claim 20, wherein a signal change of every one rotation of said DC motor is detected, thereby outputting an interruption signal, a value of a counter for continuously counting clock signals is latched each time said interruption signal is derived, and said rotational period (T) is calculated from a difference between a counter value which was previously latched and a counter value which is latched at this time.

22. A method according to claim 20, wherein said divisional period ($\Delta T$) is preset to said counter, said clock is counted, a check is made to see if said divisional period ($\Delta T$) has elapsed each time said clock count value reaches a preset value, and the calculation of said sine wave amplitude data is instructed.

* * * * *

UNITED STATES PATENT AND TRADEMARK OFFICE
CERTIFICATE OF CORRECTION

PATENT NO. : 5,723,957
DATED : March 3, 1998
INVENTOR(S) : Tetsuro Ishikawa

It is certified that error appears in the above-identified patent and that said Letters Patent is hereby corrected as shown below:

Column 3, line 8, before "every" and "one" insert a space

Column 10, line 28, delete "an RAM" and insert --a RAM-- therefor

Column 10, line 21, delete "Fig. 18" and insert --Fig. 1-- therefor

Column 12, line 11, delete "speaking"

Column 14, line 11, delete "predetermine" and insert --predetermined-- therefor

UNITED STATES PATENT AND TRADEMARK OFFICE
CERTIFICATE OF CORRECTION

PATENT NO. : 5,723,957
DATED : March 3, 1998
INVENTOR(S) : Tetsuro Ishikawa

It is certified that error appears in the above-identified patent and that said Letters Patent is hereby corrected as shown below:

Column 15, line 46, delete "Dc motor" and insert --DC motor-- therefor

Column 16, line 36, delete "predetermine"

and insert --predetermined-- therefor

Signed and Sealed this

Twelfth Day of October, 1999

Q. TODD DICKINSON

*Attest:*

*Attesting Officer*

Acting Commissioner of Patents and Trademarks